US012654505B2

(12) United States Patent (10) Patent No.:  US 12,654,505 B2

Doorlag et al. (45) Date of Patent:       Jun. 16, 2026

(54) SUSPENSION ACTUATOR SYSTEM FOR A VEHICLE

(71) Applicant: Tesla, Inc., Austin, TX (US)

(72) Inventors: Brian Lee Doorlag, Pleasanton, CA (US); Avraham Kagan, Oakland, CA (US); Justin Sill, Cupertino, CA (US)

(73) Assignee: Tesla, Inc., Austin, TX (US)

( * ) Notice: Subject to any disclaimer, the term of this patent is extended or adjusted under 35 U.S.C. 154(b) by 102 days.

(21) Appl. No.: 18/690,686

(22) PCT Filed: Sep. 22, 2022

(86) PCT No.: PCT/US2022/044438

§ 371 (c)(1),
(2) Date: Mar. 8, 2024

(87) PCT Pub. No.: WO2023/049291

PCT Pub. Date: Mar. 30, 2023

(65) Prior Publication Data

US 2024/0383297 A1      Nov. 21, 2024

Related U.S. Application Data

(60) Provisional application No. 63/247,697, filed on Sep. 23, 2021.

(51) Int. Cl.
B60G 17/016       (2006.01)
B60G 15/12        (2006.01)
B60G 17/08        (2006.01)

(52) U.S. Cl.
CPC ......... B60G 17/0161 (2013.01); B60G 15/12 (2013.01); B60G 17/08 (2013.01);
(Continued)

(58) Field of Classification Search
CPC .... B60G 17/0161; B60G 15/12; B60G 17/08; B60G 2202/312; B60G 2202/314;
(Continued)

(56) References Cited

U.S. PATENT DOCUMENTS 10,906,370  B1 *   2/2021   Hall ................... B60G 17/0157
11,046,143  B1 *   6/2021   Aikin ................. B60G 17/0195
(Continued)

FOREIGN PATENT DOCUMENTS

EP        1 870 266        12/2010
EP        2 262 654        3/2013
WO        2023049291       3/2023

OTHER PUBLICATIONS

"International Application Serial No. PCT US2022 044438, International Preliminary Report on Patentability mailed Apr. 4, 2024", 11 pgs.
(Continued)

*Primary Examiner* — Toan C To
(74) *Attorney, Agent, or Firm* — Schwegman Lundberg & Woessner, P.A.

(57)                    ABSTRACT

Embodiments relate to a suspension actuator system for a vehicle that includes an active control element, a passive control element and an adaptive damper which are mounted in series with one another along with a parallel spring.

19 Claims, 3 Drawing Sheets

(52) U.S. Cl.
CPC .. *B60G 2202/312* (2013.01); *B60G 2202/314* (2013.01); *B60G 2202/322* (2013.01); *B60G 2202/42* (2013.01); *B60G 2204/129* (2013.01); *B60G 2204/419* (2013.01); *B60G 2204/62* (2013.01); *B60G 2400/821* (2013.01); *B60G 2500/104* (2013.01); *B60G 2600/182* (2013.01); *B60G 2800/162* (2013.01); *B60G 2800/916* (2013.01)

(58) Field of Classification Search
CPC .......... B60G 2202/322; B60G 2202/42; B60G 2204/129; B60G 2204/419; B60G 2204/62; B60G 2400/821; B60G 2500/104; B60G 2600/182; B60G 2800/162; B60G 2800/916
See application file for complete search history.

(56) References Cited

U.S. PATENT DOCUMENTS

| | | | | |
|---|---|---|---|---|
| 11,124,035 | B1 * | 9/2021 | Hall | B60G 17/0157 |
| 11,173,766 | B1 * | 11/2021 | Hall | B60G 17/0164 |
| 11,358,431 | B2 * | 6/2022 | Hall | B60G 17/0155 |
| 11,518,207 | B2 * | 12/2022 | Ohno | B60G 17/0162 |
| 11,584,183 | B2 * | 2/2023 | Furuta | B60G 17/0165 |
| 11,618,293 | B2 * | 4/2023 | Ohno | B60G 17/0165 |
| | | | | 701/37 |
| 11,701,942 | B2 * | 7/2023 | Hall | B60G 17/0155 |
| | | | | 280/6.157 |
| 11,707,961 | B1 * | 7/2023 | Carter | B60G 11/27 |
| | | | | 280/6.157 |
| 11,938,773 | B2 * | 3/2024 | Kanda | B60G 17/0165 |
| 11,953,080 | B1 * | 4/2024 | Moghaddam | F16H 25/2204 |
| 12,115,827 | B2 * | 10/2024 | Hall | F16H 25/2204 |
| 2018/0297434 | A1 * | 10/2018 | Ohno | B60G 17/02 |
| 2019/0283733 | A1 | 9/2019 | Takei | |
| 2020/0171907 | A1 * | 6/2020 | Hall | F16H 25/2204 |
| 2022/0134830 | A1 * | 5/2022 | Voelkel | B64D 45/00 |
| | | | | 188/313 |

OTHER PUBLICATIONS

"European Application Serial No. 22790411.7, Response to Communication Pursuant to Rules 161 and 162 EPC Filed Oct. 18, 2024", 15 pgs.

International Search Report and Written Opinion dated Dec. 5, 2022 in application No. PCT/US/2022/044438.

"European Application Serial No. 22790411.7, Communication Pursuant to Article 943 EPC mailed Jul. 17, 2025", 4 pgs.

"European Application Serial No. 22790411.7, Response filed Sep. 8, 2025 to Communication Pursuant to Article 943 EPC mailed Jul. 17, 2025", 7 pgs.

"European Application Serial No. 22790411.7, Communication Pursuant to Article 943 EPC mailed Sep. 15, 2025", 7 pgs.

"Japanese Application Serial No. 2024-517387 , Voluntary Amendment Filed Sep. 19, 2025", w English Claims, 7 pgs.

"European Application Serial No. 22790411.7, Response filed Dec. 23, 2025 to Communication Pursuant to Article 943 EPC mailed Sep. 15, 2025", W English Claims, 12 pgs.

"European Application Serial No. 22790411.7, Communication Pursuant to Article 943 EPC mailed Mar. 17, 2026", 6 pgs.

* cited by examiner

SUSPENSION ACTUATOR SYSTEM FOR A VEHICLE

INCORPORATION BY REFERENCE TO ANY PRIORITY APPLICATIONS

This application claims priority to U.S. Provisional Application No. 63/247,697, filed Sep. 23, 2021, the contents of which is incorporated by reference in its entirety.

BACKGROUND OF THE INVENTION

Field of the Invention

This application relates to an active suspension system for an automobile. More specifically, this application relates to an electronic suspension system for an automobile.

Description of the Related Art

Automobiles use a variety of active suspension systems to improve the vehicle's performance. Some suspension systems use passive springs and dampers, while others use electronic systems which a detect changes in the road surface. Active suspension systems may use onboard sensors to measure and/or predict the movement of the vehicle on the road and then counteract any jarring movement from an uneven road by controlling the action of the suspension system connected to each tire.

Active suspension systems detect alterations in various road conditions and make comparable alterations to the position of the suspension to improve the vehicle dynamics and ride of the vehicle for the comfort of the passengers. These systems typically deploy energy using a pneumatic, hydraulic or electrically-driven system to achieve a desired level of suspension performance. Hydraulic systems may be activated to deliver the energy using a predetermined hydraulic pressure and flow rate in response to detecting changes in the road. Other systems may us an electric motor to deliver the energy to the wheel that achieves the desired road handling and suspension performance.

SUMMARY OF THE INVENTION

One embodiment is a suspension actuator system for a vehicle. The suspension actuator system may include: an active control element communicating with a suspension control system to move a vehicle wheel in response to road conditions; a series passive control element comprising a spring and/or damper mounted in series with the active control element; and a parallel passive control element comprising a spring mounted in parallel with the active control element.

One embodiment is a suspension actuator system for a vehicle. This embodiment includes: an active control element communicating with a suspension control system to move a vehicle wheel in response to road conditions; a series passive control element comprising a first spring or damper mounted in series with the active control element; and a parallel passive control element comprising a second spring or damper mounted in parallel with the active control element.

Another embodiment is a suspension actuator system for a vehicle. This embodiment includes: a series passive control element comprising a first spring or damper; a parallel passive control element comprising a second spring or damper; an active control element communicating with a suspension control system to move a vehicle wheel in response to road conditions and comprising a processor configured to perform a method of: detecting movement of the vehicle on a roadway; determining when the vehicle requires active control of the suspension; and activating the active control element to move a wheel of the vehicle to smooth the vehicle ride; wherein the series passive control element is mounted in series with the active control element and the parallel passive control element is mounted in parallel with the active control element.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
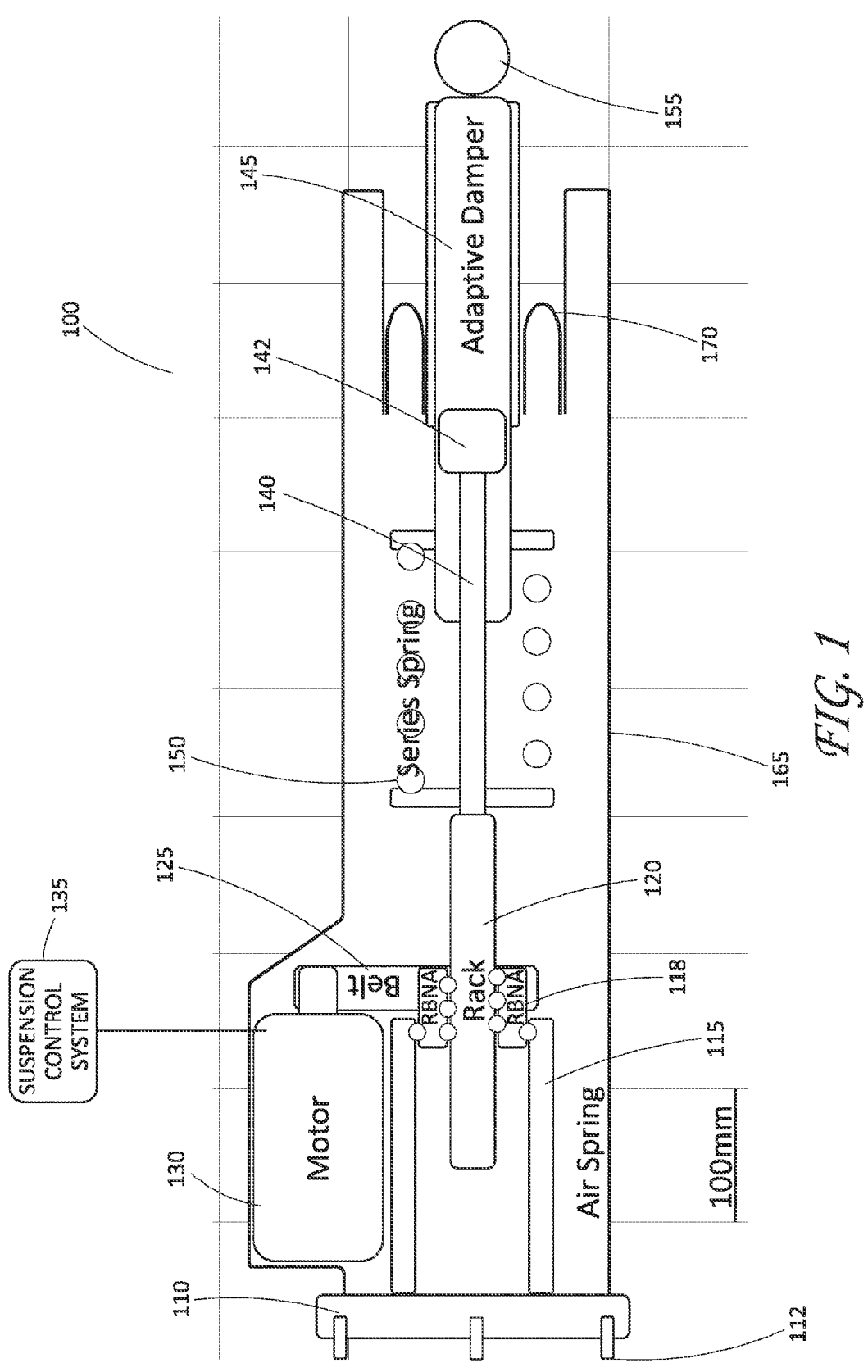
FIG. 1 is a schematic diagram of a suspension actuator for a vehicle according to one embodiment.

All patents, patent applications, and other publications, including all sequences disclosed within these references, referred to herein are expressly incorporated herein by reference, to the same extent as if each individual publication, patent or patent application was specifically and individually indicated to be incorporated by reference. All documents cited are, in relevant part, incorporated herein by reference in their entireties for the purposes indicated by the context of their citation herein. However, the citation of any document is not to be construed as an admission that it is prior art with respect to the present disclosure.

Embodiments relate to a suspension actuator that is configured to control vehicle kinematics and control the ride quality of a vehicle. The suspension actuator may include an active control element in series with passive control elements. The suspension actuator may also be in parallel with passive control elements. In some embodiments, the suspension actuator is in series and in parallel with the passive control elements. In some embodiments, the active control element is in parallel with some passive elements, such as an air spring and in series with other passive elements.

The active control element may be a motor or other electrically controllable component. A suspension control system may communicate with the active control element to monitor the speed, ride and position of the vehicle and wheels and take action to improve the ride performance of the vehicle. As used herein, the term "ride" generally relates to the excitations of a vehicle body caused by the road, as well as any roll, pitch and bounce motions of the vehicle body. A set of vehicle ride sensors may be distributed throughout the vehicle and/or wheels to detect position, speed and vibrations within the vehicle. These sensors may include vibration sensors, accelerometers, or other sensor types configured to measure the position of the vehicle or wheels as the vehicle is driving on a road. The data from the sensors may be fed into the suspension control system in order to control the active control element and improve the ride quality.

In one embodiment, the passive element may be a spring or other damper that is positioned in parallel with the active element. The spring or other damper may be a relative low rate spring, such as an air spring, which can bear the weight, and help to offset, the effects of gravity on the vehicle. In addition, placing a passive element, such as an air spring, in parallel with the active control element may reduce the power requirement placed on the active component by helping alleviate the forces of gravity that would otherwise need to be overcome as the active element was actuated to move the tire.

In addition to parallel passive elements, the system may also include passive elements in series with one or more active elements. For example, a series spring may be positioned within the system to limit the power and/or bandwidth requirement of the one or more active elements. The series spring or damper may be sized and configured to mitigate or reduce high frequency, high velocity or high-power inputs from the road before they are transferred to the one or more active components.

In other embodiments, the suspension actuator system also includes an adaptive damper which may be also in series with the active control element and the passive control element and configured to help control ride quality of the vehicle. There are several types of adaptive dampers which can be electronically controlled and used in embodiments of the invention. For example, magnetorheological dampers filled with synthetic oil containing iron particles may be used in one embodiment. Such dampers use a magnetic field from one or more magnetic coils to control the resistance to motion of the adaptive damper. Another embodiment may use a valve-actuated adaptive damper which can control the rate of flow of a fluid through the piston to alter the stiffness of the adaptive damper.

FIG. 1 shows one embodiment of a suspension actuator system 100 which includes a proximal end having a vehicle body mount 110 having mounting bolts 112 for mounting to the vehicle body. The body mount 110 connects to a housing 115. The proximal end of the housing 115 mounts to the body mount 110 and the distal end of the housing 115 mounts to a rotating ball nut assembly 118. The ball nut assembly 118 connects to a threaded screw system 120 and a belt 125. The belt 125 is driven by a motor 130. As the motor 130 is activated to turn, the belt 135 rotates which rotates the ball nut assembly 118. Rotational movement of the ball nut assembly 118 translates into lateral movement of the threaded screw 120. As the laterally positioned threaded screw 120 moves, it connects to a piston shaft 140 to a piston head 142 that is part of an adaptive damper 145. The adaptive damper 145 mates to a connector 155 which mounts to a vehicle knuckle or suspension arm that moves an associated wheel (not shown).

A suspension control system 135 connects to the motor 130 to activate the motor when a sensor or other device detects the position of the vehicle body and motion of the wheel. For example, accelerometers or wheel position sensors may be used to detect the spatial position and movement of the vehicle and wheel over time. The control system 135 may monitor the rotation, current, and voltage of the motor 130 as it senses the position of the vehicle and activates the motor to damp road vibrations and other undesirable wheel movements.

In some embodiments, the controller 135 communicates between various vehicle subsystems, including the vehicle steering system, a vehicle sensor system, and the suspension actuator system 100. The controller 135 may include at least one microprocessor that communicates throughout the vehicle with other systems and storages, such as computer readable storage devices. The controller 135 may communicate directly, or through other components, with the plurality of sensors sensing the vehicle position and movement.

The controller 135 may be programmed to actuate at least one of the first suspension actuator 74 and the second suspension actuator 80 in response to detection of certain conditions of the vehicle. For example, detection of a pothole in the road being struck may cause the controller 135 to activate the motor 130 to retract the wheel and damp the effect of the pothole on movement of the vehicle.

As shown in FIG. 1, the threaded screw 120 connects through the piston shaft 140 and piston head 142 to the adaptive damper 145. The adaptive damper 145 may act as a shock absorber between the wheel and the vehicle body. The adaptive damper may be a passive component such as a hydraulic shock absorber which is not electronically controlled. Alternatively, the adaptive damper may be a more active component that is controlled by the suspension control system 135.

The piston shaft 140 and piston head 142 are mounted to the rack 120, all of which move together. A series spring 150 acts between the rack 120 and the active damper 145. The action of the spring 150 is thereby in series with the active control elements. The adaptive damper 145 mounts to a vehicle suspension or knuckle (not shown) through the mount 155 at the distal end of the adaptive suspension system 100. The vehicle suspension or knuckle then connects to a wheel.

An air spring 165 is mounted in parallel with the active control element comprising the motor 130, belt 125, and threaded screw 120. The air spring includes an air spring sleeve 170 which seals the air spring to provide a pressurized gas volume as a force medium which can be compressed to provide a desired elasticity of the air spring. In one example, the spring rate of the air spring may be 3N/mm, 2N/mm or less. The spring rate of air may be between 0.1N/mm and 1N/mm, 1N/mm and 3N/mm, 1N/mm and 2N/mm or other ranges including these values. Changing the pressure of air in the air spring may also be a component of setting a vehicle's ride height. The air spring 165 may have a relatively low spring rate and be configured to help offset the weight of gravity from the vehicle to the wheel. The spring rate is the change in the force it exerts, divided by the change in deflection of the spring. Vehicles that carry heavy loads, will often have heavier springs to compensate for the additional weight that would otherwise collapse a vehicle to the bottom of its travel (stroke). Heavier springs are also used in performance applications, where the loading conditions experienced are more significant.

As can be appreciated by review of the suspension actuator system 100, the series spring 150 is located in a mostly vertical plane running parallel to the adaptive damper 145 and the rack 120. For example, the series spring may have a spring rate of approximately 50N/mm. In other embodiments, the series spring may have a spring rate between 25N/mm and 75N/mm, 25N/mm and 50N/mm, or 50N/mm and 75N/mm or any range within these values. When the series spring 150 is compressed or stretched, the force it exerts between the vehicle body and the wheel, is proportional to its change in length.

The configuration of the adaptive damper in series with an active system controlled by the motor 130 may advantageously manage the various types of inputs affecting the vehicle as it drives down a road. For example, the series spring-damper system described above is generally very helpful for minimizing the effects of high frequency (oscillations or cycles per second) inputs, such as road vibrations, on the vehicle. The active system is generally very helpful to minimize the effects of low frequency inputs, such as when the vehicle undulates or rolls due to relatively subtle changes in the road surface.

Figure 2:
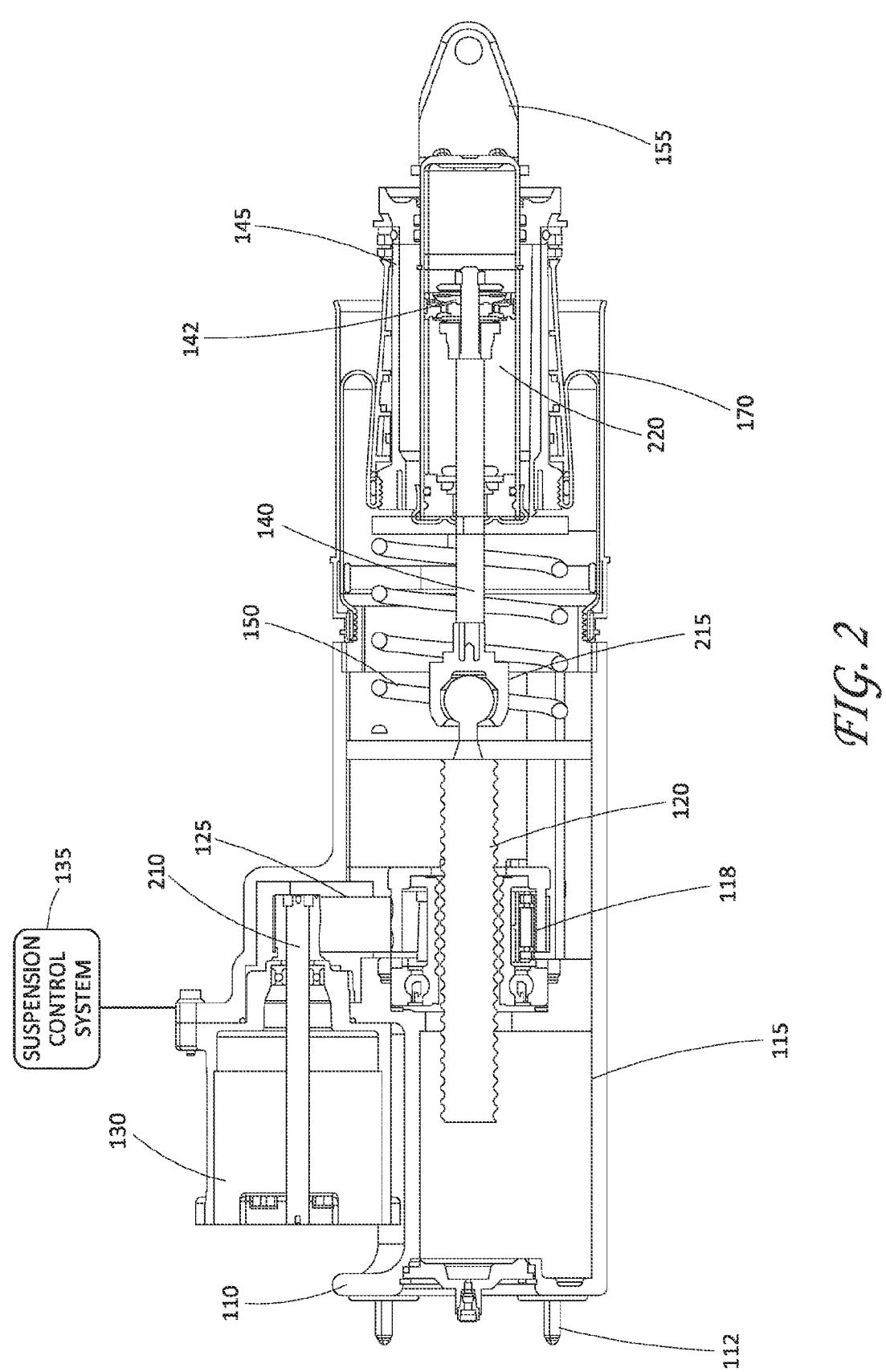
FIG. 2 is a cross-sectional schematic diagram of a suspension actuator having a passive component and an active component according to one embodiment.

FIG. 2 shows a cross-sectional view with additional details of the suspension actuator system 100. As shown, the motor 130 includes a motor shaft 210 which rotates the belt 125. As the belt 125 turns, it spins the rotating ball nut assembly 118 which results in lateral movement of the threaded screw 120. The threaded screw 120 connects to a ball and socket connector 215 to provide a movable connection between the threaded screw 120 and the piston shaft 140. The piston shaft 140 moves the piston head 142 within the piston chamber 220.

Electronic inputs to the suspension control system 135 can therefore be used to control the movement of the piston head 142. For example, sensor inputs to the suspension control system 135 can indicate that the wheel connected to a vehicle through the mount 155 may need to be pulled upwards to smooth the ride. The suspension control system 135 would then activate the motor 130 to turn the belt 125. Turning the belt 125 spins the rotating ball nut assembly 118 which moves the threaded screw 120 backwards towards the mounting bolts 112. This is shown more fully with respect to FIG. 3.

Figure 3:
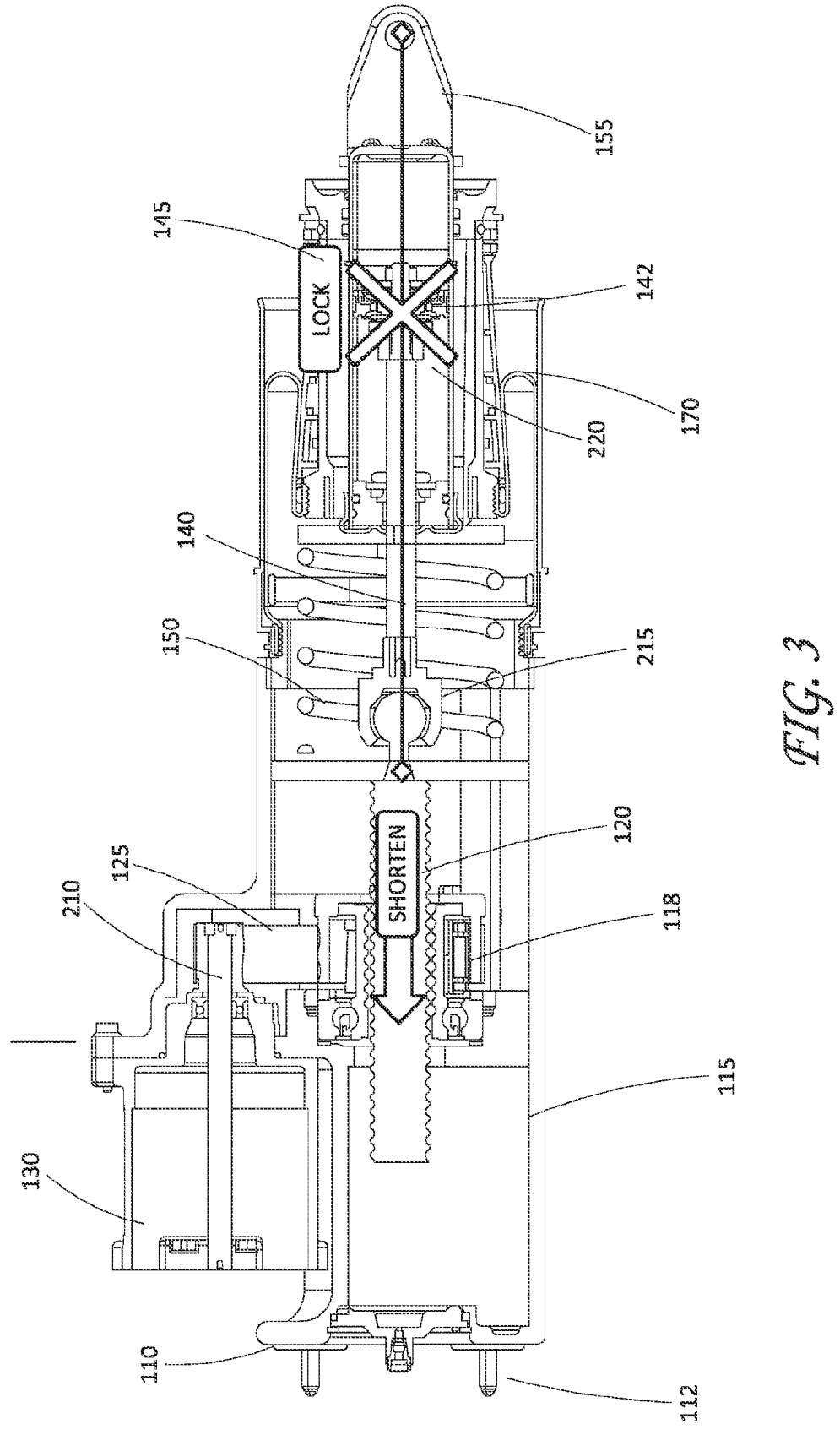
FIG. 3 is a cross-sectional schematic diagram of the suspension actuator of FIG. 2, where the passive component is locked and the active component is shortened to pull upwards on an attached vehicle wheel.

FIG. 3 shows a cross-sectional view of the suspension actuator 100 as it's being controlled to pull up on the wheel. The piston within the adaptive damper may be locked so that it provides a stiff bar which doesn't move when tension or compression is applied. The motor 130 then moves the threaded screw 120 to shorten the total length of the suspension actuator 100 which results in the wheel being pulled up in relation to the vehicle body. The parallel spring 165 helps offset the weight of the vehicle which allows the motor to use less force to pull up on the wheel since some of the vehicle weight has been offloaded to the parallel spring 165.

Thus, in some embodiments, the system includes an active control element communicating with the suspension control system to move a vehicle wheel to smooth the ride of the vehicle. For example, detecting that a wheel is entering a pothole and then activating the active control element to pull up on the wheel to prevent it from dipping sharply in the pothole. The system, in response to road conditions, may be programmed to use its internal (or external) processor to perform a method of: detecting movement of the vehicle on a roadway; determining when the vehicle requires active control of the suspension; and activating the active control element to move a wheel of the vehicle to smooth the vehicle ride. The system may use the active control element in this way while also having the series passive control element mounted in series with the active control element and the parallel passive control element mounted in parallel with the active control element.

Additional Notes

The embodiments described herein are exemplary. Modifications, rearrangements, substitute processes, etc. may be made to these embodiments and still be encompassed within the teachings set forth herein. One or more of the steps, processes, or methods described herein may be carried out by one or more processing and/or digital devices, suitably programmed.

The various illustrative imaging or data processing techniques described in connection with the embodiments disclosed herein can be implemented as electronic hardware, computer software, or combinations of both. To illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative detection systems described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, systems described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" or "a device to" are intended to include one or more recited devices. Such one or more recited devices can also be collectively configured to carry out the stated recitations. For example, "a processor to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A suspension actuator system for a vehicle, comprising:
an active control element communicating with a suspension control system to move a vehicle wheel in response to road conditions;
a series passive control element comprising a first spring or damper mounted in series with the active control element; and
a parallel passive control element comprising a second spring or damper mounted in parallel with the active control element, wherein the parallel passive control element comprises a spring having a rate of less than 3 N/mm.

2. The suspension actuator system of claim 1, further comprising an adaptive damper in series with the active control element, wherein the adaptive damper is controllable.

3. The suspension actuator system of claim 1, wherein the parallel passive control element comprises an air spring.

4. The suspension actuator system of claim 1, wherein the active control element is in electronic communication with the suspension control system which controls an activity of the active control element.

5. The suspension actuator system of claim 4, wherein the suspension control system is in communication with one or more sensors attached to the vehicle.

6. The suspension actuator system of claim 1, wherein the suspension actuator system comprises a mount for connecting to a wheel and the active control element comprises a motor configured to move a position of the wheel.

7. The suspension actuator system of claim 6, wherein the motor is mechanically connected to turn a ball nut assembly.

8. The suspension actuator system of claim 7, wherein the ball nut assembly is connected to a threaded screw which moves in response to movement by the ball nut assembly.

9. The suspension actuator system of claim 8, wherein movement of the threaded screw results in movement of the position of the wheel.

10. The suspension actuator system of claim 8, wherein the threaded screw is connected to a piston, and wherein movement of the piston results in movement of the position of the wheel.

11. A suspension actuator system for a vehicle, comprising:
a series passive control element comprising a first spring or damper;
a parallel passive control element comprising a second spring or damper;
an active control element communicating with a suspension control system to move a vehicle wheel in response to road conditions and comprising a processor configured to perform a method of:
detecting movement of the vehicle on a roadway;
determining when the vehicle requires active suspension control; and
activating the active control element to move a wheel of the vehicle to smooth a vehicle ride, wherein the active control element comprises a motor mechanically connected to turn a ball nut assembly to move the wheel of the vehicle;
wherein the series passive control element is mounted in series with the active control element and the parallel passive control element is mounted in parallel with the active control element.

12. The suspension actuator system of claim 11, wherein the suspension actuator system further comprises an adaptive damper which is electronically controllable by the processor.

13. The suspension actuator system of claim 11, wherein the suspension control system is in electronic communication with one or more sensors attached to the vehicle.

14. The suspension actuator system of claim 11, wherein the suspension actuator system comprises a mount for connecting to a wheel and the processor is programmed to control movement of the motor.

15. The suspension actuator system of claim 11, wherein the ball nut assembly is connected to a threaded screw which moves in response to movement by the ball nut assembly.

16. A suspension actuator system for a vehicle, comprising:

an active control element communicating with a suspension control system to move a vehicle wheel in response to road conditions;

a series passive control element comprising a first spring or damper mounted in series with the active control element, and a parallel passive control element comprising a second spring or damper mounted in parallel with the active control element, wherein the suspension actuator system comprises a mount for connecting to a wheel, and the active control element comprises a motor configured to move a position of the wheel, and wherein the motor is mechanically connected to turn a ball nut assembly.

17. The suspension actuator system of claim 16, wherein the ball nut assembly is connected to a threaded screw which moves in response to movement by the ball nut assembly.

18. The suspension actuator system of claim 17, wherein movement of the threaded screw results in movement of the position of the wheel.

19. The suspension actuator system of claim 17, wherein the threaded screw is connected to a piston, and wherein movement of the piston results in movement of the position of the wheel.

* * * * *